United States Patent [19]

Horowitz et al.

[11] 4,091,193

[45] May 23, 1978

[54] RECHARGEABLE SILVER-ZINC BATTERIES

[75] Inventors: Carl Horowitz; Michael Dichter, both of Brooklyn, N.Y.

[73] Assignee: Polymer Research Corp. of America, Brooklyn, N.Y.

[21] Appl. No.: 783,448

[22] Filed: Mar. 31, 1977

[51] Int. Cl.² .................. H01M 4/48; H01M 10/24
[52] U.S. Cl. .................................. 429/219; 429/228; 429/231
[58] Field of Search ............. 429/229, 231, 230, 225, 429/228, 219, 206, 57, 59; 106/296, 297; 252/518

[56] References Cited

U.S. PATENT DOCUMENTS

| | | | |
|---|---|---|---|
| 2,213,168 | 8/1940 | Monk et al. | 106/297 |
| 3,580,740 | 5/1971 | James | 429/206 |
| 3,639,176 | 2/1972 | Nordblom et al. | 429/229 X |
| 3,816,178 | 6/1974 | Maki et al. | 429/206 |

*Primary Examiner*—Anthony Skapars
*Attorney, Agent, or Firm*—Steinberg & Blake

[57] ABSTRACT

The evolution of hydrogen in rechargeable silver-zinc batteries is reduced by the incorporation into the zinc electrode of a minor proportion of a lead oxide, e.g. either lead oxide (PbO) or lead dioxide (PbO$_2$). The invention further relates in general to electrodes for batteries, said electrodes consisting mainly of zinc oxide and having a small amount of lead oxide or lead dioxide distributed therethrough.

6 Claims, 4 Drawing Figures

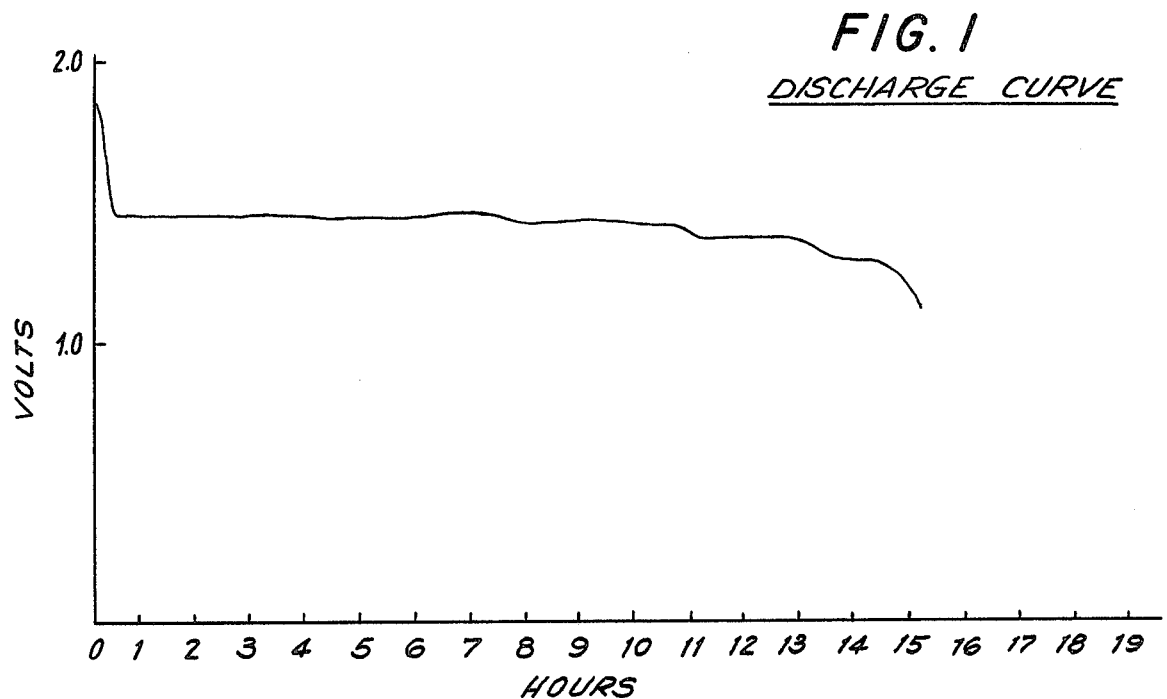
FIG. 1 DISCHARGE CURVE
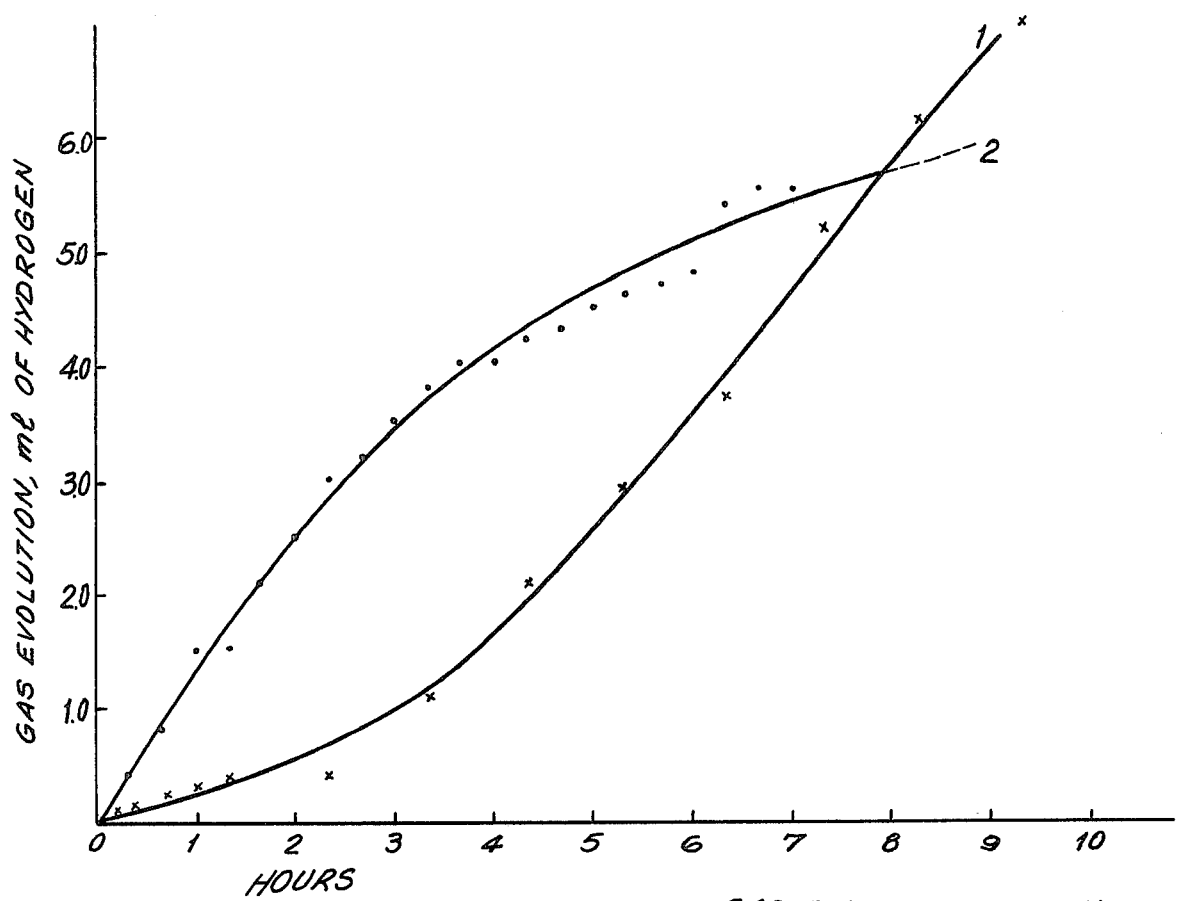
FIG. 2 GAS EVOLUTION, DISCHARGE

CHARGE CURVE

GAS EVOLUTION, CHARGE

RECHARGEABLE SILVER-ZINC BATTERIES

BACKGROUND OF THE INVENTION

Electric batteries with alkaline cells, both accumulator type and primary type, have been used for several years and found to be highly effective because of their characteristics of high capacity per unit weight and unit volume. Among the most important of this type battery has been the battery constructed with a positive electrode of silver and the negative electrode of zinc.

Batteries of this type are used to function under all climatic conditions, at high altitudes and as emergency energy sources which require that the batteries retain electrical energy potential and capacity over long periods of time. One of the difficulties with these batteries is the relatively high amount of hydrogen evolved at the negative electrode particularly during high temperature storage.

SUMMARY OF THE INVENTION

Generally speaking, in accordance with the present invention, zinc electrodes for use in alkaline batteries of all types, and particularly for use in high energy density silver-zinc batteries, are provided wherein hydrogen evolution is highly reduced compared with ordinary known zinc electrodes.

Pure zinc electrodes provide a relatively high degree of hydrogen evolution, and such hydrogen evolution has been reduced somewhat by the use of zinc electrodes containing a small amount of mercury in the form of mercuric oxide. These electrodes when used in silver-zinc batteries do provide a reduced degree of hydrogen evolution as compared to the use of pure zinc electrodes. However, the introduction of mercury creates a serious problem for the production and use of the silver zinc batteries. Mercury is a dangerous metal and both its vapors and salts are highly toxic. Consequently, the use of such batteries provides danger, for example in the case of use thereof in submarines wherein hydrogen evolution should be reduced to a minimum but wherein the production of mercuric salts and vapors could be dangerous.

It is accordingly a further object of the present invention to provide zinc electrodes which when used in alkaline batteries provide reduced hydrogen evolution along with safety which is required of such batteries.

It is yet a further object of the present invention to provide electrodes of zinc oxide and a lead oxide, which batteries can be used in alkaline cells, particularly in silver-zinc batteries, to provide batteries having a highly reduced level of hydrogen evolution while providing increased capacity.

Other objects and advantages of the present invention would be apparent from a further reading of the specification and of the appended claims.

With the above and other objects in view, the present invention mainly comprises an electrode for alkaline batteries, said electrode consisting essentially of zinc oxide with a small amount of a lead oxide distributed therethrough.

The invention further provides alkaline cells comprising an alkaline electrolyte, a positive electrode in contact with the electrolyte and a negative electrode in contact with the electrolyte, the negative electrode containing as active material a mixture of zinc oxide and a lead oxide.

In accordance with the present invention the amount of lead oxide incorporated into the electrode should be between about 1–4% by weight and most preferably between about 1–3.5% by weight.

The zinc electrodes of the present invention may be formed by simply mixing the lead oxide (PbO) or the lead dioxide ($PbO_2$) with zinc oxide in normal manner and forming the electrodes from the mixture.

The use of such zinc electrodes in which 1–4% of lead dioxide or lead oxide is mixed with zinc oxide to form the zinc electrode, in alkaline electric storage batteries results in reduced hydrogen evolution both during the charge and the discharge cycle of the battery.

DESCRIPTION OF THE PREFERRED EMBODIMENTS

The following examples are given to illustrate the present invention. The scope of the invention is not, however, meant to be limited to the specific details of the examples.

EXAMPLE 1

120 Grams of zinc oxide powder, 2.4 grams of polyvinyl alcohol powder (2% by weight) and 1.8 grams of lead dioxide (1.5% by weight) are blended in a mixer. 10 cc of water is added dropwise into the mixture during the mixing. Ten zinc plates of a size 2 5/16 by 1 9/16 inches are manufactured from the mix according to the standard procedures of preparation of a plate (Arthur Fleischer and John J. Lander, Zinc-Silver oxide batteries, John Wiley & Sons, Inc. (1971) page 189).

The electroformation of the plates is effected at three amps for about 20 hours in a tank containing a solution of 45% potassium hydroxide and deionized water. The zinc electrodes are then removed from the tank and washed in deionized water to remove KOH until drops of water from the zinc plates show a pH of 7. Electrodes are then dried in an oven at 50° C.

EXAMPLE 2

Example 1 is repeated, however using 3 grams (2.5% by weight) of lead dioxide.

EXAMPLE 3

Example 1 is repeated, however using 4.2 grams (3.5% by weight) of lead dioxide.

EXAMPLE 4

Example 1 is repeated, however using 1.8 grams of lead oxide (PbO) in place of the lead dioxide.

EXAMPLE 5

Example 2 is repeated, however using 3 grams of lead oxide (PbO) in place of the lead dioxide.

EXAMPLE 6

Example 3 is repeated, however using 4.2 grams of lead oxide (PbO) in place of the lead dioxide.

Battery cells were prepared utilizing the zinc electrodes from each of the above examples. In each cell there were nine zinc electrodes and eight silver electrodes used. Each of the zinc electrodes was wrapped with "Pellon" (trademark for a brand of non-woven nylon in sheet form) and heat sealed on the sides and top. Silver electrodes were individually wrapped and sealed off on the sides leaving the top open. A pair of silver electrodes wrapped with Pellon, laid end-to-end on a piece of silver coated cellophane sheet (7 × 16.5 inches) were then wrapped four and one half turns and bent into a "U" shape. Four "U's" were made for each cell. Silver electrodes in "U" shape and individual zinc electrodes arranged next to each other were placed in a cell case with a gas outlet tube on the cover. The case was tested for leakage by immersing it in water and applying air pressure with a rubber bulb through the gas outlet tube. If there were any leak, the air bubbles would show up through the leaks in the case, and the leaks would be repaired.

45% Potassium hydroxide solution was then added to the cell just above the top of the zinc electrodes but not over the top of the "U"-shaped electrodes. The voltage of the cell on open circuit was measured to be 1.86 volts.

The completed cell was then discharged at a rate of 10% of capacity and the current and cell voltage recorded every 20 minutes. During discharge, gas evolution was also measured every 20 minutes utilizing a conventional apparatus for measurement of gas volume, consisting of a mercury column and a levelling bulb.

After discharging for about 11 hours, the cell was charged at a rate of 1.5 amps to the cutoff voltage, i.e. 2.05 volts. During charge, gas evolution was monitored in the same manner as during discharge.

Comparisons were made with a commercial cell of the same type, the commercial cell being formed with negative electrodes consisting of a mixture of zinc oxide and mercuric oxide.

For a fuller understanding of the invention, reference is had to the following description of the graphs showing the results of the tests indicated above, taken in connection with the accompanying drawings, in which:

FIG. 1 is a graph showing the discharge curve of the cell of Example 1;

FIG. 2 is a graph showing the curves for gas evolution during discharge of the cell of Example 1 as compared to the commercial cell utilizing negative electrodes of zinc oxide and mercuric oxide, the gas evolutions being indicated as a function of time;

Referring more particularly to the drawings, the discharge curve of FIG. 1 sets forth the discharge relationship in volts as a measure of time given in hours.

In FIG. 2, curve 1 is a curve showing the gas evolution in ml of hydrogen of the commercial cell whereas curve 2 sets forth the gas evolution in ml of hydrogen of the cell of the present invention, both recorded as a function of the time in hours.

Figure 3:
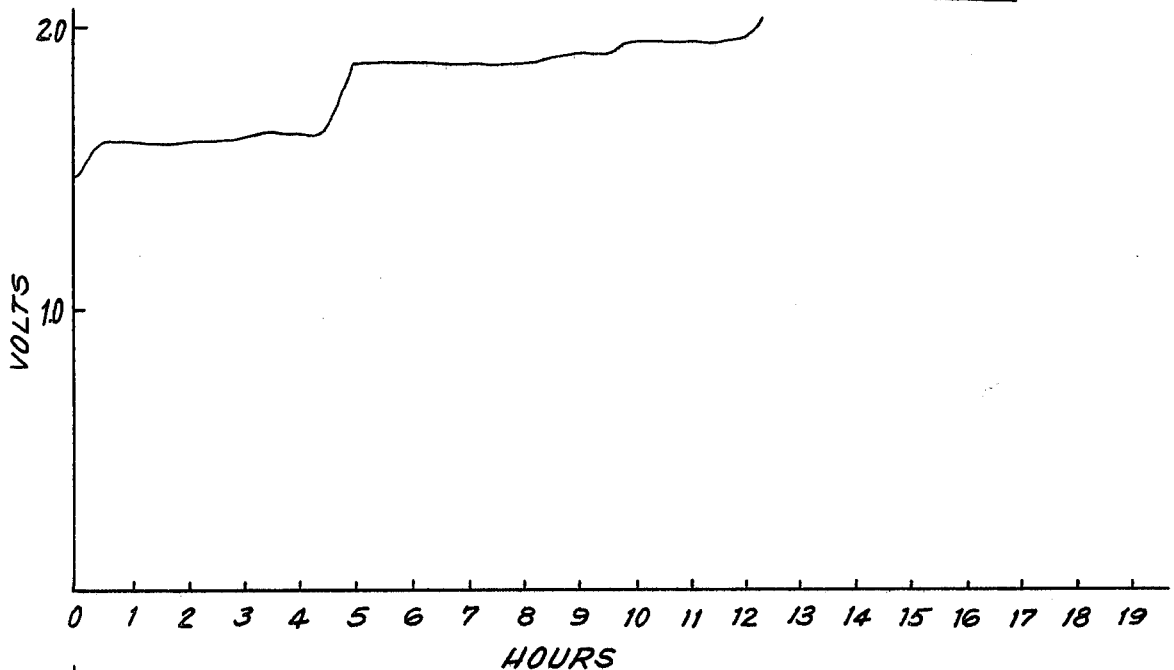
FIG. 3 is a graph showing the charge curve of the cell.

In FIG. 3 the charge curve of the cell of the present invention is set forth as a function of time in hours.

Figure 4:
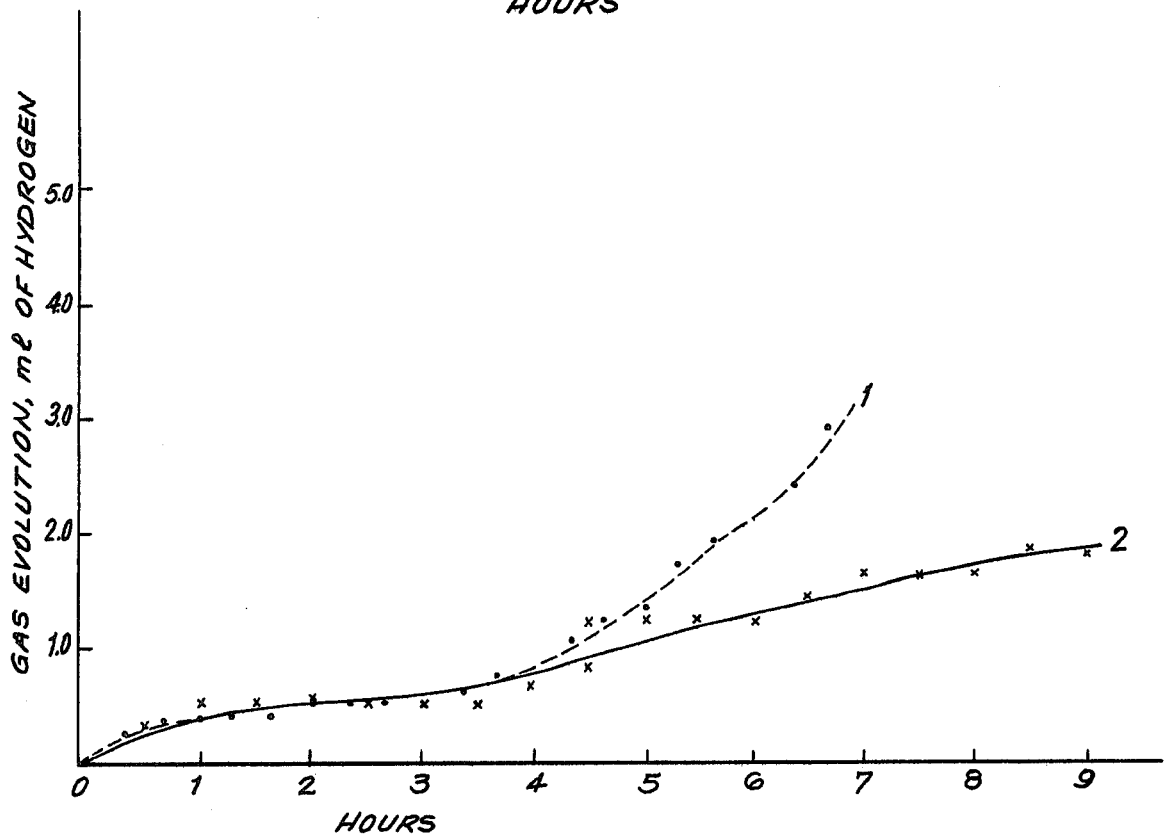
FIG. 4 is a graph setting forth the curves of the gas evolution during charge of the cell comparing the commercial cell with the cell of the present invention.

In FIG. 4 curve 1 sets forth the gas evolution in ml of hydrogen as a function of time of the commercial cell, whereas FIG. 2 sets forth the same results for the cell of the present invention.

5 to 10 Cycles of charge and discharge of the batteries were run and the amount of hydrogen evolution measured. In each case the hydrogen evolution of the cell of the present invention exhibited significant further decrease in the last cycles.

It is thus apparent that the cells of the present invention not only avoid the dangers of toxicity of cells utilizing mercuric oxide, but that the cells of the present invention actually possess superior characteristics to the commercial cells which utilize mercuric oxide.

While the invention has been described in particular with respect to specific compositions and arrangements, it is apparent that variations and modifications thereof can be made.

What is claimed is:

1. Electrode for alkaline cells consisting essentially of zinc oxide and between about 1–4% by weight of a lead oxide selected from PbO and $PbO_2$.

2. Electrode according to claim 1 in which the amount of said lead oxide is between 1–3.5% by weight.

3. An alkaline cell, comprising an alkaline electrolyte, a positive electrode in contact with said electrolyte and the electrode of claim 1 as the negative electrode and being in contact with said electrolyte.

4. An alkaline cell, comprising an alkaline electrolyte, a positive electrode in contact with said electrolyte and the electrode of claim 2 as the negative electrode and being in contact with said electrolyte.

5. Alkaline cell according to claim 1 and wherein said positive electrode contains silver as active material.

6. Alkaline cell according to claim 4 and wherein said positive electrode contains silver as active material.

* * * * *